US008924852B2

(12) United States Patent (10) Patent No.: US 8,924,852 B2
Ikawa et al. (45) Date of Patent: Dec. 30, 2014

(54) APPARATUS, METHOD, AND PROGRAM FOR SUPPORTING PROCESSING OF CHARACTER STRING IN DOCUMENT

(75) Inventors: Yohei Ikawa, Kanagawa-ken (JP); Makoto Kano, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 13/015,849

(22) Filed: Jan. 28, 2011

(65) Prior Publication Data
US 2011/0191673 A1 Aug. 4, 2011

(30) Foreign Application Priority Data
Jan. 29, 2010 (JP) .................................. 2010-18300

(51) Int. Cl.
*G06F 17/24* (2006.01)
*G06F 3/14* (2006.01)
*G06F 21/62* (2013.01)
*G06F 17/27* (2006.01)

(52) U.S. Cl.
CPC .............. *G06F 3/14* (2013.01); *G06F 21/6245* (2013.01)
USPC ........... 715/256; 715/230; 715/231; 715/232; 715/233; 715/257; 715/271

(58) Field of Classification Search
CPC ................................ G06F 3/14; G06F 21/6245
USPC .......................... 715/230–233, 256, 257, 271
See application file for complete search history.

(56) References Cited

U.S. PATENT DOCUMENTS

| 6,782,510 | B1* | 8/2004 | Gross et al. | 715/257 |
| 7,720,783 | B2* | 5/2010 | Staddon et al. | 706/46 |
| 7,802,305 | B1* | 9/2010 | Leeds | 726/26 |
| 8,090,669 | B2* | 1/2012 | Shahani et al. | 706/14 |
| 2002/0156816 | A1* | 10/2002 | Kantrowitz et al. | 707/530 |

(Continued)

FOREIGN PATENT DOCUMENTS

| JP | 2002259368 A | 9/2002 |
| JP | 2004227141 A | 8/2004 |
| JP | 2007172404 A | 7/2007 |

OTHER PUBLICATIONS

Ikawa, et al., "Implementation and Evaluation of Translation-Assistance Tool for Office Documents," 23rd Annual Conf. of the Japanese Soc. for AI, 2009, pp. 1-4.

*Primary Examiner* — Stephen Hong
*Assistant Examiner* — Wilson Tsui
(74) *Attorney, Agent, or Firm* — Scully, Scott, Murphy & Presser, P.C.; Preston J. Young. Esq.

(57) ABSTRACT

A support apparatus, computer-implemented method, and article of manufacture for supporting a processing of a character string in a document. The support apparatus includes: a document storage unit; a designation reception unit; a document acquisition unit; a historical-information storage unit; a reference-information generator; and a presentation unit. The method includes: receiving designation from a user; acquiring a document from the document storage device based on the designation by the user; reading pieces of historical information related to the acquired document from the historical-information storage device, and thereby generating reference information for helping the user to select a processing of the character string in the document; and presenting, to the user, a screen for receiving the designation of the processing of the character string in the acquired document, together with the reference information.

20 Claims, 11 Drawing Sheets

(56) References Cited

U.S. PATENT DOCUMENTS

| | | | |
|---|---|---|---|
| 2006/0046711 A1* | 3/2006 | Jung et al. | 455/423 |
| 2007/0030528 A1* | 2/2007 | Quaeler et al. | 358/453 |
| 2007/0150299 A1* | 6/2007 | Flory | 705/1 |
| 2008/0155398 A1* | 6/2008 | Bodin et al. | 715/257 |
| 2009/0019379 A1* | 1/2009 | Pendergast et al. | 715/762 |

* cited by examiner

| | DOCUMENT NAME | WORD NAME | LOCATION IN DOCUMENT | DESIGNATION CONTENT (UNMASKING / MASKING) | USER NAME (USER ID) | GROUP NAME (GROUP ID) | TIME STAMP |
|---|---|---|---|---|---|---|---|
| 1 | SYSTEM REQUIREMENTS DEFINITION | ABC BANK | /Slide(1) /Title(1) /TextRange(0,5) | MASKING | TARO SUZUKI (1234) | 1ST DEVELOPMENT DEPT. (112) | 2009/12/11 |
| 2 | SYSTEM REQUIREMENTS DEFINITION | PROJECT | /Slide(1) /Shape(5) /TextRange(5,11) | UNMASKING | JIRO SATO (5678) | 2ND DEVELOPMENT DEPT. (113) | 2009/11/08 |
| | ... | ... | ... | ... | ... | ... | ... |

FIG. 3

APPARATUS, METHOD, AND PROGRAM FOR SUPPORTING PROCESSING OF CHARACTER STRING IN DOCUMENT

CROSS-REFERENCE TO RELATED APPLICATIONS

This application claims priority under 35 U.S.C. §119 to Japanese Patent Application No. 2010-18300 filed Jan. 29, 2010, the entire contents of which are incorporated by reference herein.

BACKGROUND OF THE INVENTION

1. Field of the Invention

The present invention relates to a technique for supporting a processing of a character string in a document. More particularly, the invention relates to a technique for helping a user to determine the content of a processing of the character string in the document by providing reference information.

2. Description of the Related Art

Recently, call logs of a customer support center or the like have been utilized for planning a business strategy, and project documents created in the past have been shared for reuse to enhance the efficiency or the quality. Such call logs or documents, however, include confidential information or personal information such as an organization name or a product name in many cases. Before the call logs or the documents are used, the confidential information or the personal information needs to be masked in advance.

The "black-list" masking technique is a conventionally known technique which uses a dictionary that includes risky words to be masked, matches words with the risky words, and replaces the matched words with turned letters (for example, see Japanese Application Publication No. 2002-259368 and Japanese Application Publication No. 2004-227141). However, since the "black-list" masking technique has a drawback in that masked words are limited to ones detected on a dictionary or rule basis, some of the candidates to be masked might not be detected. Thus, a detection error needs to be corrected manually. This causes problems in that masking is not efficiently performed in a short time and that there is a risk of leaking confidential or personal information if a risky word is overlooked by human error.

Another masking is the "white-list" masking technique. The technique performs masking by first masking all words, and then unmasks any word determined to be safe based on a safe word list enumerating safe words common to all the documents. In the "white-list" masking technique, even though a safe word that would normally be unmasked might remain in a masked state when the word is not included in the list, confidential or personal information does not leak. A full-fledged safe word list improves readability. However, because a safe word list is created manually, creating such a list is time-consuming.

Japanese Application Publication No. 2007-172404 and Yohei Ikawa, Daisuke Takuma, and Hiroshi Kanayama, "A Masking System for Confidential Documents by Unmasking Safe Words," Technical Report of the Institute of Electronics, Information and Communication Engineers, DE, Data Engineering, Vol. 106, pp. 79-84, Jul. 7, 2006 disclose techniques in which, for creation of a safe word list common to all the documents, the importance of a word is calculated based on the frequency of appearance, the character string length, and the likeness of the word; and words are presented in descending order in the importance to prompt a user to determine whether or not to unmask each of the words. Yohei Ikawa, Daisuke Takuma, and Hiroshi Kanayama, "A Masking System for Confidential Documents by Unmasking Safe Words," Technical Report of the Institute of Electronics, Information and Communication Engineers, DE, Data Engineering, Vol. 106, pp. 79-84, Jul. 7, 2006 shows an experimental example in which, by processing words in descending order in the importance in the manner as mentioned above, 90% readability was achieved through checking of 35% of the total words.

Accordingly, the above techniques enable efficient creation of a full-fledged safe word list common to all the documents manually. However, the aforementioned experimental example shown in Yohei Ikawa, Daisuke Takuma, and Hiroshi Kanayama, "A Masking System for Confidential Documents by Unmasking Safe Words," Technical Report of the Institute of Electronics, Information and Communication Engineers, DE, Data Engineering, Vol. 106, pp. 79-84, Jul. 7, 2006 shows that 65% of the rest of the words need to be checked in order to increase the readability from 90% to 100%. Also from a cost-effectiveness viewpoint, it is not appropriate that a limited number of staffs such as a creator or an administrator of a document take charge of checking the 65% of the rest of words for increasing the readability.

SUMMARY OF THE INVENTION

According to one aspect of the present invention, a support apparatus is provided for supporting a processing of a character string in a document to be described below. Such a support apparatus includes: a document storage unit which stores a plurality of shared documents; a designation reception unit which receives a designation from a user; a document acquisition unit which acquires one of the documents from the document storage unit based on the designation of the user; a historical-information storage unit which stores pieces of historical information on past processings of character strings in the documents in the document storage unit; a reference-information generator which reads historical information pieces related to the acquired document from the historical-information storage unit, and thereby generates reference information for helping the user to select a processing of a character string in the document; and a presentation unit which presents, to the user, a designation reception screen for receiving designation of the processing of the character string in the acquired document, together with the reference information.

According to another aspect of the present invention, a computer-implemented method for supporting a processing of a character string in a document executed by a computer. The method includes: receiving designation from a user; acquiring a document from the document storage device based on the designation by the user; reading pieces of historical information related to the acquired document from the historical-information storage device, and thereby generating reference information for helping the user to select a processing of the character string in the document; and presenting, to the user, a screen for receiving the designation of the processing of the character string in the acquired document, together with the reference information.

According to still another aspect of the present invention, an article of manufacture is provided which tangibly embodies computer readable instructions which when implemented, causes a computer to perform the steps of the computer-implemented method for supporting a processing of a character string in a document executed by a computer.

BRIEF DESCRIPTION OF THE DRAWINGS

FIG. 3 is a diagram showing an example of data structure of historical information pieces according to an embodiment of the present invention.

DETAILED DESCRIPTION OF THE PREFERRED EMBODIMENTS

Figure 1:
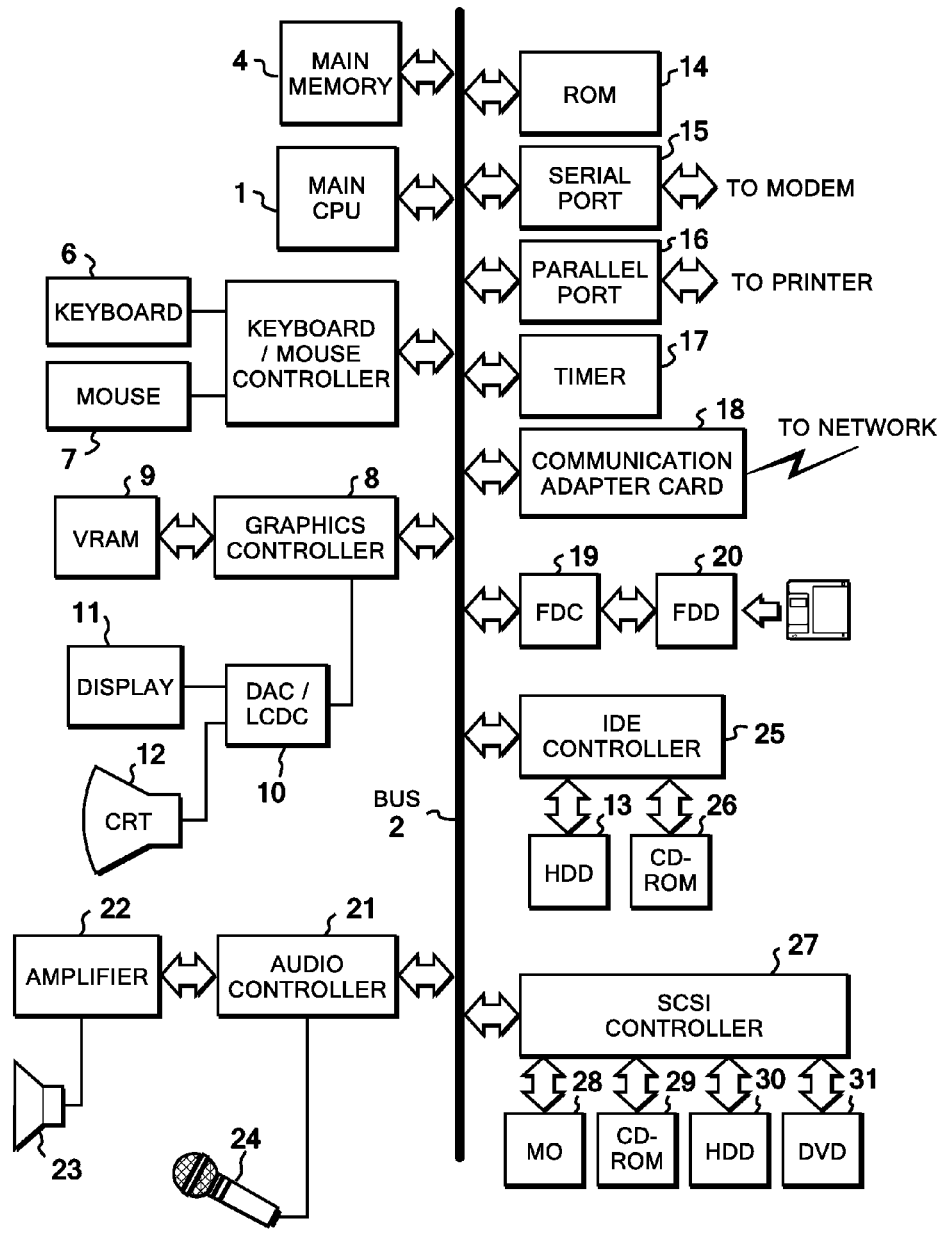
FIG. 1 is a diagram showing an example of hardware configuration of an information processor preferable as an implementation of a support apparatus 200 according to one embodiment of the present invention for supporting a processing of a character string in a document.

Hereinafter, detailed description will be given of the best embodiment modes for carrying out the present invention with reference to the drawings. The following embodiments do not restrict the invention according to the scope of the claims, and not all the combinations of the characteristics described in the embodiments are indispensable to the solving means of the present invention. Note that the same constituents are denoted by the same reference numerals through the whole description of the embodiments.

An embodiment of the present invention includes a method in which, when using a document, a user using the document designates a page desired to have an increased readability and determines whether or not to unmask words in the page.

Embodiments of the present invention provide a technique of achieving further enhancement in the readability of a document masked by using a conventional unmasking technique. More specifically, the embodiments of the present invention aim to provide a support technique for helping a user having no experience in masking to easily determine whether or not to unmask a word. Embodiments of the present invention also provide a support technique for helping a user who wishes to use a document to appropriately select the processing content of each character string in the document so that information leak risk due to a determination error can be reduced.

Referring to FIG. 1, the illustration shows an example of a hardware configuration of an information processor preferable as an implementation of a support apparatus according to one embodiment of the present invention. The information processor includes a central processing unit (CPU) 1 and a main memory 4 which are connected to a bus 2. To the bus 2, hard disk devices 13 and 30 and removable storages (external storage systems in which recording media are exchangeable) such as CD-ROM devices 26 and 29, a flexible disk device 20, an MO device 28, and a DVD device 31 are also connected through a flexible disk controller 19, an integrated drive electronics (IDE) controller 25, a small computer system interface (SCSI) controller 27, and the like.

Into these removable storages, storage media such as a flexible disk, an MO, a CD-ROM, and a DVD-ROM are inserted. These storage media, hard disk drives 13 and 30, and a ROM 14 are capable of storing therein computer program codes executed by operation in combination with an operating system to provide instructions to the CPU 1 or the like and thereby to implement the embodiments of the present invention.

In other words, the aforementioned multiple storage devices of the information processor serving as the support apparatus are capable of storing therein a program for supporting a processing of the character string in the document and data sets used by the program. Although it will be described later in detail, the data includes: multiple shared documents to be processed; pieces of historical information on past processings of character strings of each of the documents; a safe word list having character strings which are safe even without being masked; and a risky word list having character strings which are risky unless being masked. The computer program is loaded onto the main memory 4 to be executed by the CPU 1. Moreover, the computer program can be compressed or divided into pieces to be stored in multiple media.

The information processor receives inputs from input devices such as a keyboard 6 and a mouse 7 through a keyboard/mouse controller 5. The information processor also receives inputs from a microphone 24 through an audio controller 21, and outputs sounds from a speaker 23. The information processor is connected to a display 11 for presenting visual data to a user through a graphics controller 8. The information processor is connected to a network through a communication adapter card 18 (Ethernet (R) card or a token ring card) or the like, and accordingly is capable of communicating with other devices such as computers.

With the above description, it will be easily understood that the information processor preferable as an implementation of the support apparatus according to the embodiment of the present invention is implemented as an information processor, such as a work station, a main frame, or a standard personal computer, or a combination of these information processors. Note that the aforementioned components are merely examples, and not all these components are essential components for the implementation of the embodiments of the present invention.

Figure 2:
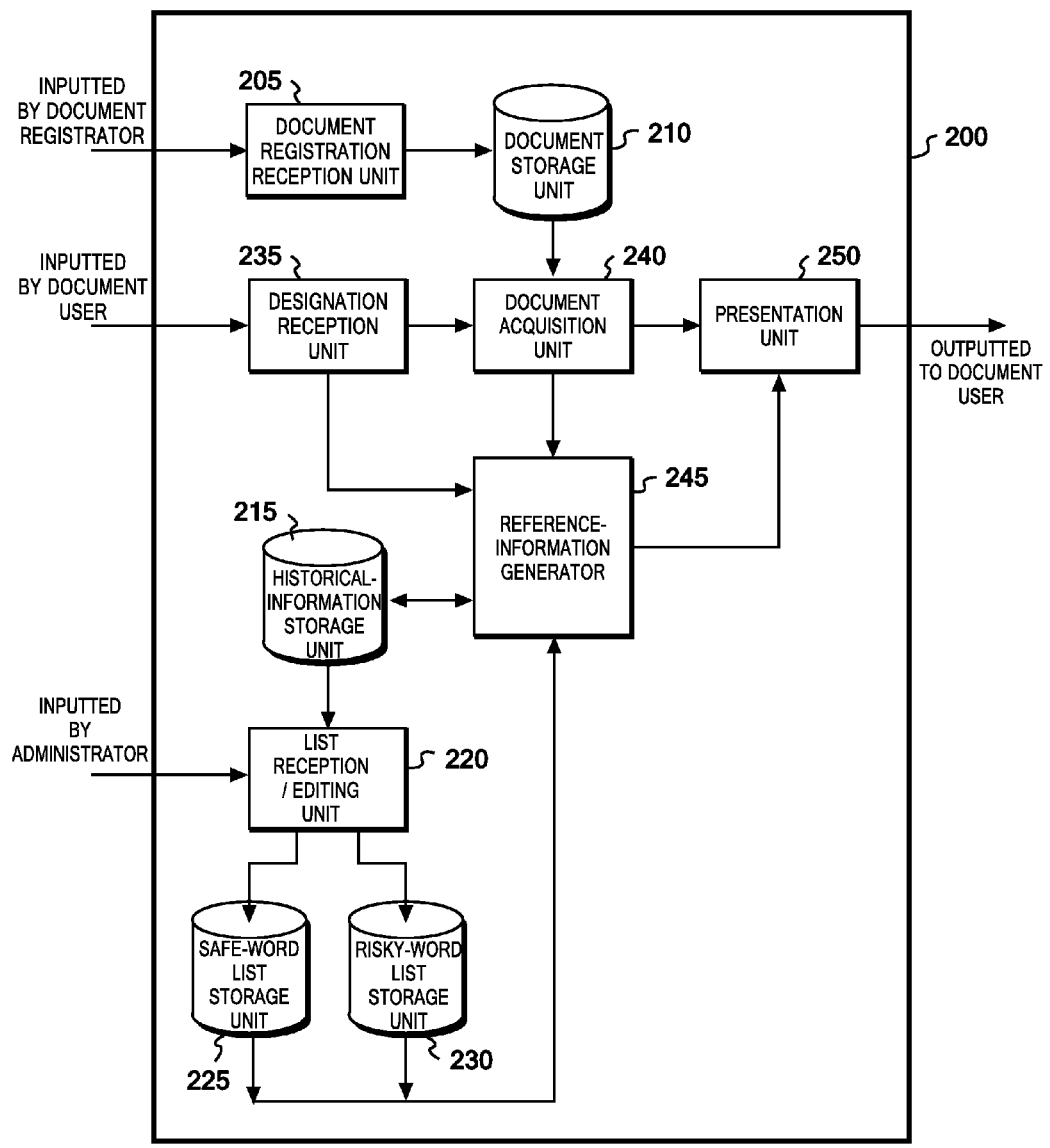
FIG. 2 is a diagram showing an example of a functional configuration of the support apparatus 200 according to one embodiment of the present invention.

Referring to FIG. 2, a diagram shows an example of a functional configuration of a support apparatus 200 for supporting a processing of a character string in a document according to one embodiment of the present invention. The support apparatus 200 includes a document registration reception unit 205, a document storage unit 210, a historical-information storage unit 215, a list reception/editing unit 220, a safe-word list storage unit 225, a risky-word list storage unit 230, a designation reception unit 235, a document acquisition unit 240, a reference-information generator 245, and a presentation unit 250. Note that in the embodiment of the present invention, a character string can be a morpheme, a word, a clause, a sentence, or a display letter type. A description will be given below on the assumption that a character string is a word.

In order to implement the support apparatus 200, a series of basic functions for acquiring structural information and text from a document and for operating the document is required. However, such functions can be implemented by a well-known technique, and an API set (for example, UNO Development Kit or Apache POI) which provides such functions is also provided. Thus, a detailed description will be omitted here. Note that this embodiment uses a framework that is an office document analysis framework (ODAF) (see "Yohei Ikawa, Hiroshi Kanayama, Hironori Takeuchi, Hideo Watanabe, Takuya Mishina, Hitoshi Akimoto, and Junya Shimizu, "Implementation and Evaluation of Translation-Assistance Tool for Office Documents," The 23rd Annual Conference of the Japanese Society for Artificial Intelligence, 2009, 314-3, 2009)").

The document registration reception unit 205 receives a registration of a sharable original document from a document registrator who could be a creator or an owner of a document, and stores the original document in the document storage unit 210. The historical-information storage unit 215 stores therein historical information pieces of past processings of words in documents in the document storage unit 210. Here, a past processing is referred to as a processing of a word in a document whose designation and confirmation have been given to the support apparatus 200 by a user before. The past processing includes at least one of an unmasking and a masking.

As shown in FIG. 3 as an example, the historical-information storage unit 215 can store therein the contents of processings of words in documents designated by the user, having the following information pieces associated therewith. Specifically, the information pieces to be associated with the contents of processings include the name of a document, the name of a word to be processed, the location of the word in the document, the content of a designated processing, the name of a user who designated the processing and/or user identification information for identifying the user, the name of a group to which the user belongs and/or group identification information for identifying the group, and time stamp information showing the time at which the designation is made. Incidentally, the group can be categorized based on a department of the organization to which the user belongs, a title of the user, or the like.

Note that the content of the processing is either an unmasking or a masking. In the case of a masking, the content of the processing can include a character, a symbol, or a graphic, with which the word is replaced. The location of the word in the document can be expressed in any format as long as the word in the document can be specified. FIG. 3 employs an expression format called Location Path in the ODAF. Location Path has a path format formed by four layers of a document, a unit, an object, and a range of text. In the document layer, a document is designated on a file basis. In the unit layer, a specific unit is designated which is defined on a document format basis, such as on a paragraph basis in a document created by a word processor, or on a slide basis in a presentation, for example. In the object layer, an element included in a unit is designated, such as a text box or a cell, for example. In the text range layer, the range of text in an object is designated. In the example in FIG. 3, the time stamp shows the date of the designation, but can include the time as well.

The list reception/editing unit 220 receives a safe word list common to all the documents from an administrator of the support apparatus 200, and stores the list in the safe-list storage unit 225. The safe word list can enumerate, for example, a verb, an adverb, an adjective, and a general noun. Alternatively, the safe word list can be a safe word list created, in accordance with the method disclosed in Japanese Application Publication No. 2007-172404 and Yohei Ikawa, Daisuke Takuma, and Hiroshi Kanayama, "A Masking System for Confidential Documents by Unmasking Safe Words," Technical Report of the Institute of Electronics, Information and Communication Engineers, DE, Data Engineering, Vol. 106, pp. 79-84, Jul. 7, 2006, by manually checking words which rank high in frequency of appearance among all the documents. In addition, the list reception/editing unit 220 can update the safe word list by using historical information pieces stored in the historical-information storage unit 215. For example, the list reception/editing unit 220 can obtain the frequency of unmaskings for each word based on the historical information pieces, and thereby add a word having higher appearance frequency than a predetermined value to the safe word list.

The list reception/editing unit 220 can further receive a risky word list common to all the documents from the administrator of the support apparatus 200, and then store the list in the risky-word list storage unit 230. The risky word list can include an enumeration of a unique expression of, for example, a name of a person, a place, an organization or the like. The risky word list can be created manually from scratch or can utilize an existing list.

The designation reception unit 235 receives a designation by a user who wishes to use a shared document stored in the document storage unit 210. The designation by the user includes a designation of: requesting a document stored in the document storage unit 210; processing a word in the document; selecting a historical information piece to be applied to the document; displaying the historical information piece; and saving the processed document. When receiving the designation of requesting a document, the designation reception unit 235 hands over the received designation to the document acquisition unit 240 to be described later. When receiving the designation of the other processings, the designation reception unit 235 hands over the received designation to the reference-information generator 245 and further to the presentation unit 250 which will be described later.

The document acquisition unit 240 searches the document storage unit 210 based on the designation by the user and thereby acquires a document desired by the user. The document acquired by the document acquisition unit 240 (hereinafter, simply referred to as a target document) is handed over to the reference-information generator 245 and further to the presentation unit 250 which will be described later.

The reference-information generator 245 reads, from the historical-information storage unit 215, historical information pieces related to the target document received from the document acquisition unit 240 and thereby generates reference information for helping the user to select a processing of words in the target document. The generated reference information is handed over to the presentation unit 250. Together with the reference information received from the reference-information generator 245, the presentation unit 250 presents to the user a designation reception screen through which designation of a processing of character strings of the target document is received.

In addition, when receiving a destination of a processing of a word in the document from the user via the designation reception unit 235, the reference-information generator 245 processes the document in such a way that the designation of the processing can be reflected on the document. At this time, the reference-information generator 245 temporarily holds the received designation, and then stores the content of the designation as a new historical information piece in the historical-information storage unit 215 on the condition that the designation of the processing is confirmed. Note that whether or not the designation of the processing is confirmed can be determined based on a request for saving the document by the user. When receiving the request for saving the processed target document from the user via the designation reception unit 235, the presentation unit 250 saves the current processed target document in a location designated by the user.

In the embodiment of present invention as described above, reference information for helping the user to select a processing is generated by using historical information pieces of an unmasking and/or a masking which are performed on character strings in documents in the past. Together with the reference information, the screen is presented to the user, through which a designation of a processing of the character strings in the corresponding document is received. Hence, the present invention enables the user of the document to easily and appropriately determine whether or not to unmask the character string regardless of whether the user has an experience of a masking.

Figure 4:
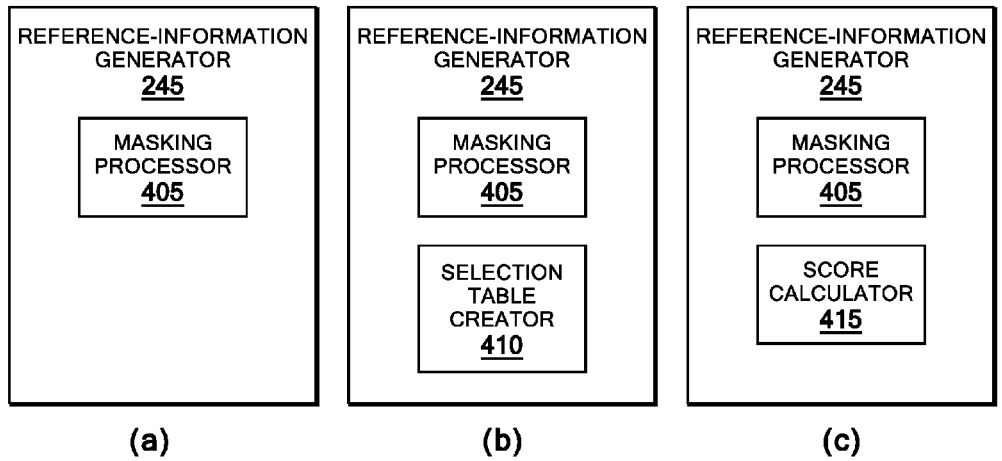
FIG. 4A is a diagram showing a first embodiment of a functional configuration of a reference-information generator 245.
FIG. 4B is a second embodiment of a functional configuration of the reference-information generator 245.
FIG. 4C is a third embodiment of a functional configuration of the reference-information generator 245.
FIG. 4D is a fourth embodiment of a functional configuration of the reference-information generator 245.
FIG. 4E is a fifth embodiment of a functional configuration of the reference-information generator 245.
Figure 4:
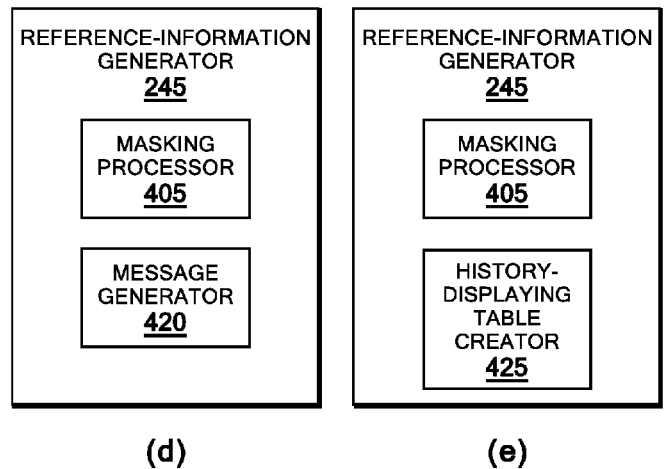

Note that there are multiple conceivable methods of generating reference information by the reference-information generator 245 by using historical information pieces on past processings, and thus a method of presenting the reference information by the presentation unit 250 varies depending on the generated reference information. The following describes the multiple methods of generating and presenting the reference information as first to fifth embodiments, respectively, by referring to FIG. 4.

First Embodiment

FIG. 4A shows a functional configuration of the reference-information generator 245 in a first embodiment of the present invention. In the first embodiment, the reference-information generator 245 includes a masking processor 405, and the masking processor 405 generates as reference information a target document subjected to a masking based on past historical information pieces.

The masking processor 405 performs a masking on the target document in such a way that read historical information pieces can be reflected on the target document. Specifically, the masking processor 405 performs a masking on the target document in such a way that, among multiple words in the target document, a word, an unmasking of which is indicated by the content of a historical information piece of the word, can be unmasked and in such a way that a word, a making of which is indicated, can be masked. The target document subjected to a masking is handed over to the presentation unit 250. The presentation unit 250 presents the target document subjected to the masking to the user as reference information together with the designation reception screen.

Meanwhile, the masking processor 405 can perform a masking by using a replacement character string, a replacement symbol, or a replacement graphic which is prepared in advance as a default one, or which is included in pieces of historical information on the masking, if any. Instead of or in addition to this, the masking processor 405 can perform the masking by referring to a dictionary to replace a target word with a broader term, if any broader term than the target word exists in the dictionary. Furthermore, the masking processor 405 can allow the user to edit the replacement character string or the replacement symbol.

Note that, as to which historical information piece to be applied to a word in a target document, any of the following three policies is employed: (1) a piece of historical information on the same word at the same position in the same document is applied; (2) a piece of historical information on the same word in the same document is applied; (3) a piece of historical information on the same word is applied. When the policy (1) is employed, a piece of historical information on a word determined to be the same in consideration of the context is applied. When the policy (2) is employed, a piece of historical information piece on a word which might possibly be used in a different context is applied. When the policy (3) is employed, the possibility is further increased. However, the employment of the policy (2) brings about intra-document utilization of a processing history of the word, and the employment of the policy (3) brings about inter-document utilization thereof in addition to the intra-document utilization. This reduces the number of words which should be processed directly by the user, thus shortening the processing time.

The aforementioned policy can be selected by the user at first as setting information of the support apparatus 200. Alternatively, the policy can be determined and set in advance based on the policy of an organization such as a company or a college, and may not be changed by the user. Accordingly, when the policy (1) or (2) is selected, a historical information piece to be read by the reference-information generator 245 as a related historical information piece from the historical-information storage unit 215 is a historical information piece associated with the same document name as the target document name. When the policy (3) is selected, a historical information piece to be read is a historical information piece associated with the same word name of a word name in a target document.

Further, for a starting point of a masking by the user, the masking processor 405 can read a safe word list common to all the documents from the safe-word list storage unit 225 and then perform a masking by reflecting the content of the safe word list on the target document before reflecting the historical information piece thereon. Instead of or in addition to this, for the starting point of the masking by the user, the masking processor 405 can read the risky word list from the risky-word list storage unit 230 and first perform a masking based on a risky word list common to all the documents.

As described above, pieces of historical information on the past processings of character strings in documents stored in the historical-information storage unit 215 each include a time stamp. When there are multiple pieces of historical information related to a target document, the masking processor 405 can perform a masking on the target document in such a way that the multiple historical information pieces can be reflected on the target document in a chronologically ascending order. This is based on an idea that a newer historical information piece includes a more appropriate processing information piece because a user performs an unmasking and/or a masking by referring to a processing performed earlier.

Meanwhile, suppose pieces historical information on past processings of a character string in a document stored in the historical-information storage unit 215 include a past unmasking and a past masking. In this case, the masking processor 405 can perform a masking on a target document in such a way that a piece of historical information on the past masking can be reflected on the target document later than the unmasking is. In this case, a word which is masked even once is necessarily masked, and thus the safety is enhanced.

When the reference-information generator 245 receives a designation of an unmasking or a masking of a word in a document from the user through the designation reception unit 235, the masking processor 405 unmasks or masks the word in the document in accordance with the designation of the processing. Specifically, when executing the unmasking or the masking, the masking processor 405 temporarily holds therein historical information pieces and the designation, of the processing from the user, based on which the processing is executed. Then, on the condition that the designation of the processing is confirmed, the masking processor 405 stores the temporarily held content of the processing as a new historical information piece in the historical-information storage unit 215. Note that whether or not the designation of the processing is confirmed can be determined based on whether or not a document save request is made by the user.

Figure 5:
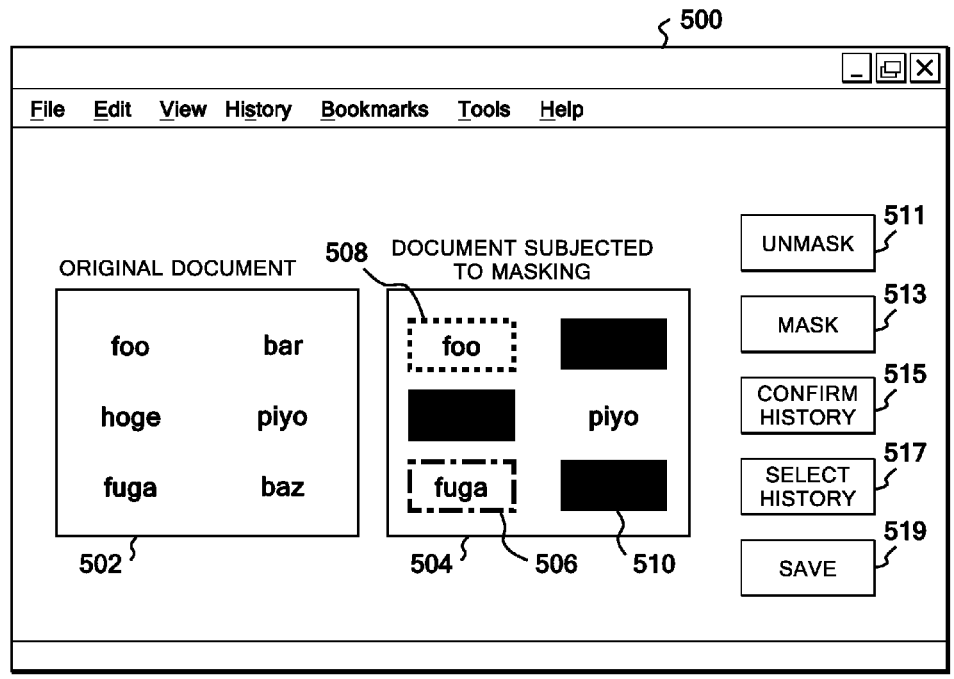
FIG. 5 shows an example of a designation reception screen 500 presented together with reference information according to an embodiment of the present invention.

FIG. 5 shows an example of a designation reception screen 500 presented together with reference information by the presentation unit 250. An original document 502 shown in a left part on the designation reception screen 500 in FIG. 5 is an original target document which is changed into an image format, and a document 504 subjected to masking shown on the right of the original document 502 is a target document subjected to a masking. For convenience, FIG. 5 shows only words, as the content of the document. The presentation unit 250 can present the original target document before a masking together with the designation reception screen 500 in this manner so that the user can determine the content of a processing of a word in consideration of context. In this case, however, it is preferable to prevent the user from copying any character string in the target document, for example, by changing the target document into an image format.

Through the designation reception screen 500 shown in FIG. 5, the user can select any character string in the document 504 subjected to masking as a processing target word. An Unmask button 511 and a Mask button 513 which are shown on the right edge of the designation reception screen 500 are buttons to designate the content of a processing. As described above, the presentation unit 250 can present to the user the target document subjected to a masking as reference information in such a mode that the target document subjected to a masking allows the user to directly select a word therein and to designate the content of a processing. In this case, based on the target document whose past historical information pieces have been reflected thereon, the user can designate an additional unmasking and a masking according to the intended use.

Second Embodiment

FIG. 4B shows a functional configuration of the reference-information generator 245 in a second embodiment of the present invention. In the second embodiment, the reference-information generator 245 further includes a selection table creator 410 in addition to the masking processor 405 according to the first embodiment. The selection table creator 410 creates a selection table enumerating applicable historical information pieces. Specifically, in the second embodiment, the reference-information generator 245 prompts the user to select a past historical information piece to be applied to a target document through a selection table created by the selection table creator 410, and then generate as reference information the target document subjected to a masking based on the historical information piece selected by the user.

The selection table creator 410 reads historical information pieces applicable to the target document from the historical-information storage unit 215, and thereby creates a selection table including the historical information pieces in such a mode that the selection table allows the user to select any historical information piece therein. Here, a historical information piece applicable to the target document is a historical information piece associated with the same document name as the target document name. In addition, in order for the user to easily select a historical information piece, the selection table creator 410 can create the selection table of historical information pieces associated with the same document name of as the target document name in such a manner that historical information pieces are grouped based on a user name or user ID and time stamp and then arranged in a chronologically ascending order.

Figure 6:
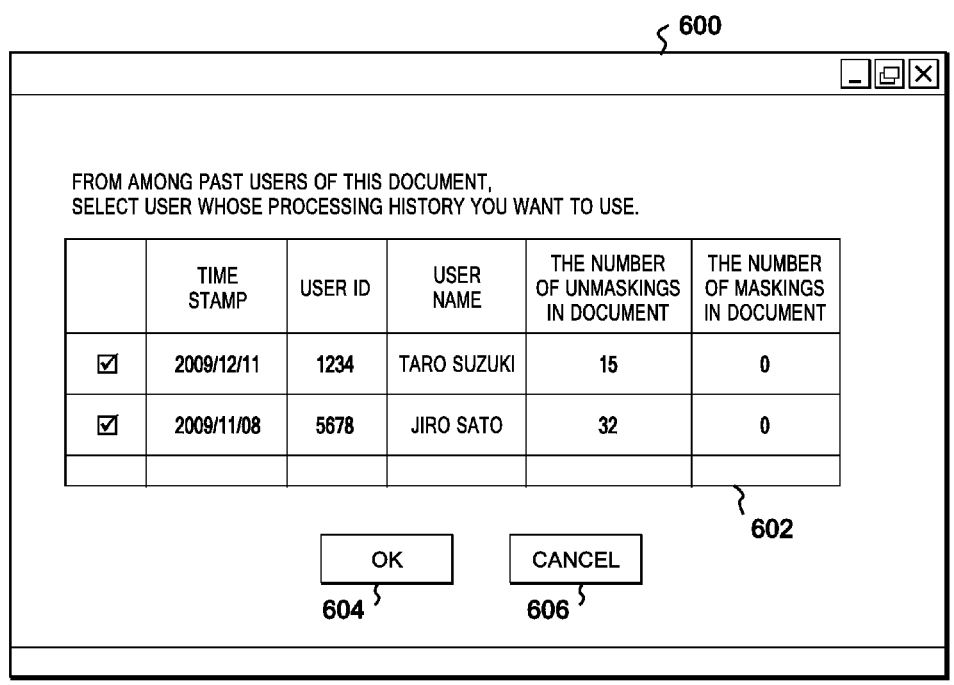
FIG. 6 is a diagram showing an example of a screen 600 showing a selection table according to an embodiment of the present invention.

FIG. 6 shows an example of the selection table created by the selection table creator 410. The selection table 602 shown in FIG. 6 includes the following fields: a time stamp, a user ID, a user name, the number of unmaskings in the document, and the number of maskings in the document. Note that the number of unmaskings in the document and the number of maskings therein can be obtained by counting unmasking designations and masking designations, respectively, in each group of the historical information pieces having the same user name or user ID and time stamp.

When presented with a selection table 602 as shown in FIG. 6, the user can select a historical information piece to be applied to the processing based on the date, the user having recorded the history, the number of unmaskings, or the number of maskings. Note that instead of or in addition to the user ID and the user name, the selection table can be provided with a field of a name or an ID of a group which can be categorized based on the department or title of the user. In this case, the user can select a historical information piece of a group which is considered to be reliable in masking.

The selection table created by the selection table creator 410 is handed over to the presentation unit 250. The presentation unit 250 can present the selection table created by the selection table creator 410 to the user, as a new window 600, as shown in FIG. 6, which is different from a window of the designation reception screen, or as a part of the window of the designation reception screen. In order to display the selection table as a new window that is different from the window of the designation reception screen, the designation reception screen 500 can be provided with a button 517 for history selection as shown in FIG. 5, for example. If the button 517 for history selection is pressed, the selection table creator 410 can create a selection table, and the presentation unit 250 can present the created selection table as the different window 600 to the user.

The designation reception unit 235 receives a designation of the selection of a historical information piece by the user through the selection table, and hands over the designation to the masking processor 405. The masking processor 405 performs a masking on the target document in such a way that the historical information piece selected by the user can be reflected on the target document. The description of the other processings by the masking processor 405 has been already given in the description of the reference-information generator 245 in the first embodiment, and thus is omitted here. Note that, in the second embodiment, the masking processor 405 can perform a masking on the target document based on the safe word list and/or the risky word list common to all the documents before the user selects a historical information piece. In addition, the presentation unit 250 can create the designation reception screen to be first presented to the user by using the target document subjected to the masking as described by referring to FIG. 5.

Third Embodiment

FIG. 4C shows a functional configuration of the reference-information generator 245 in a third embodiment of the present invention. In the third embodiment, the reference-information generator 245 further includes a score calculator 415 in addition to the masking processor 405 according to the first embodiment. The score calculator 415 calculates a score of each word in a target document by using historical information pieces stored in the historical-information storage unit 215, by quantifying the safety in using the word in an unmasked state. In other words, in the third embodiment, the reference-information generator 245 generates as reference information a score by which the safety of each word is quantified by using historical information pieces.

The score calculator 415 calculates the score of each word by obtaining how many times the word in the target document has been used before in an unmasked state. Specifically, the score calculator 415 calculates the score in accordance with the following equation:

$$S = aA + bB + cC - dD - eE - fF \quad (1)$$

In the equation (1), S denotes a score to be obtained, lower-case letters a to f denote coefficients to be determined in such a way that relations of a>b>c and d>e>f can hold true.

The letters of capital A to F denote the following:
A: How many times the word is unmasked at the same position in the same document.
B: How many times the word is unmasked at a different position in the same document.
C: How many times the word is unmasked in a different document.
D: How many times the word is masked at the same position in the same document.
E: How many times the word is masked at a different position in the same document.
F: How many times the word is masked in a different document.

It should be noted that any of the times above A to F can be counted based on the historical information pieces stored in the historical-information storage unit 215 shown in FIG. 3. Alternatively, the score calculator 415 can calculate the score described above for only a word in an unmasked state.

The score calculator 415 hands over the calculated score S of the word to the presentation unit 250 as reference information together with the name of the word and the location thereof in the document. Instead of this, the score calculator 415 can determine the rank of the score by comparing the score of the word with a score threshold having been set in advance for each safety rank, and then hand over the rank information to the presentation unit 250 as reference information together with the word name.

The masking processor 405 performs a masking on the target document in such a way that a historical information piece related thereto can be reflected on the target document. Instead of or in addition to the historical information piece, the masking processor 405 can also perform the masking on the target document based on the safe word list and/or the risky word list common to all the documents. Since the description of the other processings by the masking processor 405 has been already given in the description of the reference-information generator 245 in the first embodiment, a further description thereof is omitted here. The masking processor 405 hands over the target document subjected to the masking to the presentation unit 250.

The presentation unit 250 receives the target document subjected to the masking, and score information pieces of words in the target document or rank information pieces thereof, and presents the information pieces to the user as reference information together with the designation reception screen. For example, the presentation unit 250 can present the score information pieces of the words by arranging them near the corresponding words in the target document subjected to the masking. As another example, the presentation unit 250 can display a score information piece of a word in a way that the score information piece pops up near the word in response to placement of a mouse pointer on the corresponding word.

As still another example, the presentation unit 250 can highlight words in the target document subjected to the masking in accordance with the rank information pieces thereof. FIG. 5 shows such highlighting of the rank information pieces. In FIG. 5, scores have been calculated for words "piyo," "foo," and "fuga" which are in an unmasked state, so that the ranks thereof have been determined. The determined ranks are shown in the following manner. The words "foo" and "fuga" are highlighted, which are ranked as having low safety, and the word "piyo" is normally displayed, which is ranked as having high safety. In this manner, a word ranked as having low safety is distinctly displayed, for example, by highlighting. This makes it possible to remind the user that there is a high risk of information leak if the word remains in the unmask state.

Fourth Embodiment

FIG. 4D shows a functional configuration of the reference-information generator 245 in a fourth embodiment of the present invention. In the fourth embodiment, the reference-information generator 245 further includes a message generator 420 in addition to the masking processor 405 according to the first embodiment. When the designation reception unit 235 receives designation of a processing through the designation reception screen presented by the presentation unit 250, the message generator 420 determines whether or not the designation satisfies a predetermined condition by using historical information pieces stored in the historical-information storage unit 215. When the designation satisfies the condition, the message generator 420 generates a message for confirming the designation. In other words, in the fourth embodiment, the reference-information generator 245 generates as reference information a message for confirming the content of the designation created by using historical information pieces.

When the designation reception unit 235 receives a designation of an unmasking of a word in the target document by the user, the message generator 420 preferably generates a message for confirming the designation on the condition that historical information pieces stored in the historical-information storage unit 215 do not include a historical information piece of an unmasking of the word. Instead of or in addition to this, when the designation reception unit 235 receives a designation of an unmasking of a word in the target document by the user, the message generator 420 can generate a message for confirming the designation on condition that the historical information pieces stored in the historical-information storage unit 215 include a historical information piece of a masking of the word.

Furthermore, the message generator 420 can generate a message for confirming the designation by using the risky word list stored in the risky-word list storage unit 230. Specifically, when the designation reception unit 235 receives a designation of an unmasking of a word in the target document by the user, the message generator 420 can generate a message for confirming the designation on condition that the risky word list includes the word.

Figure 7:
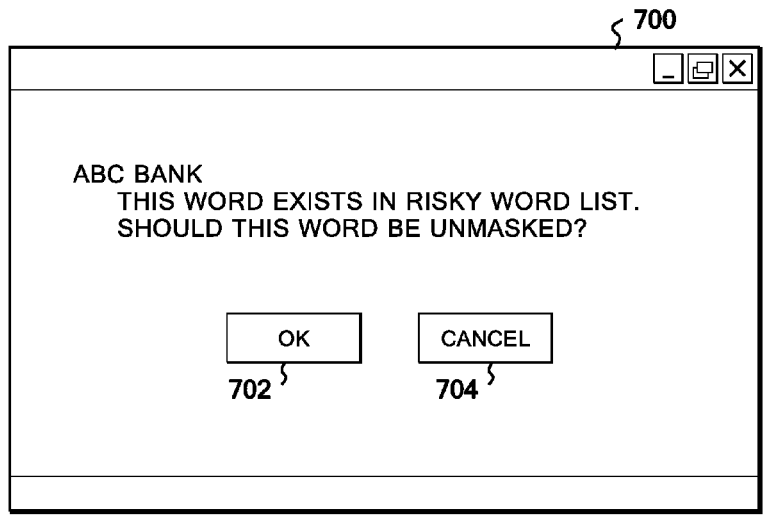
FIG. 7 is a diagram showing an example of a screen 700 showing a confirmation message according to an embodiment of the present invention.

In any of the cases above, the confirmation message thus generated is handed over to the presentation unit 250, and presented to the user by the presentation unit 250. FIG. 7 shows an example of a confirmation message presented by the presentation unit 250 in this manner. The example shown in FIG. 7 is a message generated when the user designates an unmasking of a word included in the risky word list. As described above, the presentation unit 250 can display a confirmation message in a window different from the designation reception screen 500.

Note that a masking of the target document performed by the masking processor 405 before the generation of the confirmation message by the message generator 420, and presentation of the designation reception screen by the presentation unit 250 by using the target document have been already described in the description of the reference-information generator 245 in the first embodiment. Thus, a further description thereof is omitted.

Fifth Embodiment

FIG. 4E shows a functional configuration of the reference-information generator 245 in a fifth embodiment of the present invention. In the fifth embodiment, the reference-information generator 245 further includes a history-displaying table creator 425 in addition to the masking processor 405 according to the first embodiment. The history-displaying table creator 425 generates a table enumerating the contents of past processings of a word selected and designated by the user, based on historical information pieces stored in the historical-information storage unit 215. In other words, in the fifth embodiment, the reference-information generator 245 generates, as reference information, a list of past processings of the word selected and designated by the user.

Upon receipt of designation of selecting historical information pieces of a word in a target document from the designation reception unit 235, the history-displaying table creator 425 reads historical information pieces of past processings of the word from the historical-information storage unit 215. Note that the historical information pieces read from the historical-information storage unit 215 can be determined based on any of the three policies described in the first embodiment. That is, a historical information piece read is (1) a historical information piece of the same word at the same position in the same document, (2) a historical information piece of the same word in the same document, and/or (3) a historical information piece of the same word. The history-displaying table creator 425 creates a history-displaying table enumerating the read historical information pieces.

Figure 8:
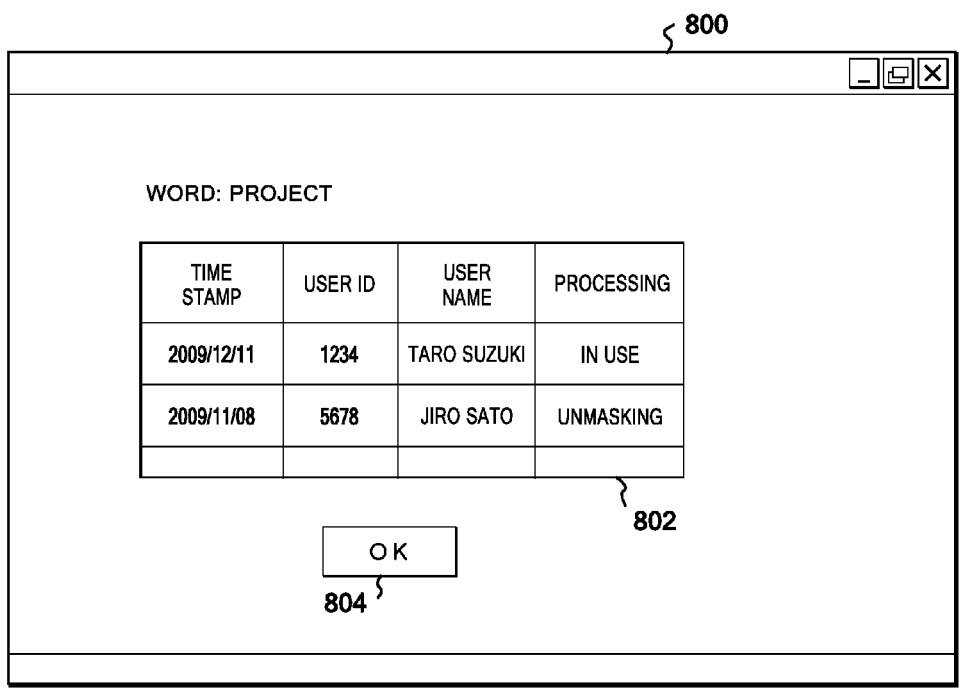
FIG. 8 shows an example of a screen 800 of a history-display table according to an embodiment of the present invention.

FIG. 8 shows an example of a history-displaying table 802 created by the history-displaying table creator 425 when the user selects and designates a word "project" in the target document. In the example shown in FIG. 8, the history-displaying table 802 includes fields of a time stamp, a user ID, a user name, and a processing. Here, an entry of the processing field is the content of a past processing, that is, either "unmasking" or "masking." However, when the historical information piece is currently applied to the processing, a value "in use" can be entered in the processing field.

The history-displaying table created by the history-displaying table creator 425 is handed over to the presentation unit 250. The presentation unit 250 can present the history-displaying table created by the history-displaying table creator 425 to the user as a new window 800, as shown in FIG. 8, which is different from the window of the designation reception screen, or a part of the window of the designation reception screen. In order to display the history-displaying table as the new window 800 different from the window of the designation reception screen, the designation reception screen 500 can be provided with a button 515 for history confirmation, for example, as shown in FIG. 5. If the button 515 for history confirmation is pressed in a state where a desired word is selected by using the mouse or the like, the history-displaying table creator 425 can create a history-displaying table related to the selected and designated word, and the presentation unit 250 can present the created history-displaying table as a different window to the user.

Note that a masking of the target document performed by the masking processor 405 before the creation of the history-displaying table by the history-displaying table creator 425, and presentation of the designation reception screen by the presentation unit 250 by using the target document have been already described in the description of the reference-information generator 245 in the first embodiment. Thus, a further description thereof is omitted.

Figure 9:
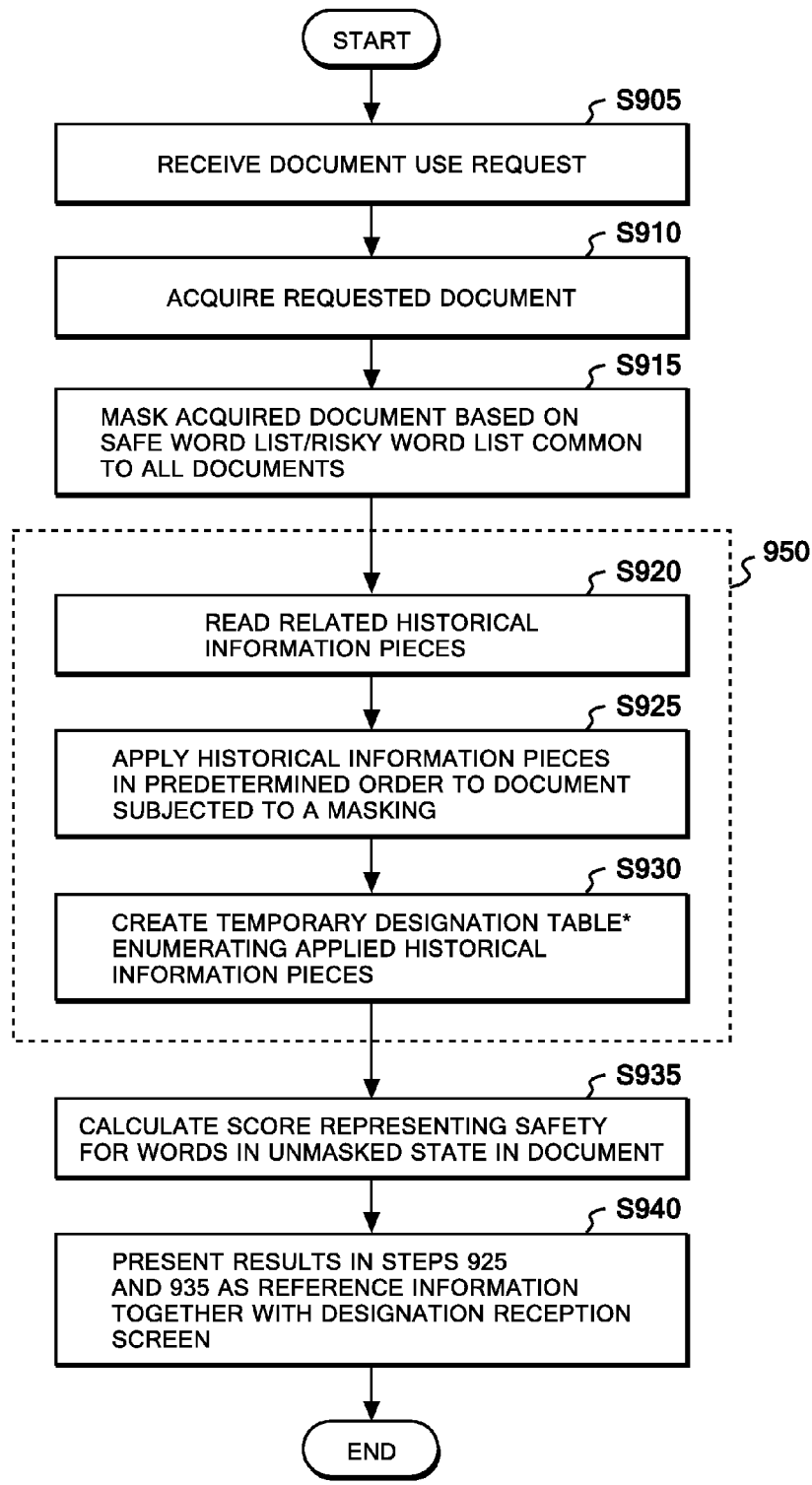
FIG. 9 is a flowchart showing an example flow of a processing of presentation by the designation reception screen 500 according to an embodiment of the present invention.

Next, referring to FIG. 9, a description is given of an example of a support processing flow for supporting a processing of a character string in a document according to one embodiment of the present invention. FIG. 9 illustrates a flowchart showing an example flow of a processing of presentation by the designation reception screen. In FIG. 9, the processing is started in Step 905 where the designation reception unit 235 receives a document use request from a user. The designation reception unit 235 hands over the document use request to the document acquisition unit 240, and the document acquisition unit 240 searches the document storage unit 210 to acquire the requested document (Step 910). The acquired document is handed over to the reference-information generator 245 and further to the presentation unit 250.

The reference-information generator 245 hands over the acquired document to the masking processor 405, and the masking processor 405 performs a masking on the document in such a way that only words which are read from the safe-word list storage unit 225 and are listed in the safe word list can be in an unmasked state (Step 915). Instead of or in addition to this, the masking processor 405 can perform a masking on the document in such a way that all the words which are read from the risky-word list storage unit 230 and are listed in the risky word list can be in a masked state.

Subsequently, the masking processor 405 reads historical information pieces related to the received document, from the historical-information storage unit 215 (Step 920), and further performs a masking on the document subjected to the masking in such a way that the read historical information pieces can be reflected on the document in a predetermined order such as in the chronologically ascending order (Step 925). At this time, the masking processor 405 creates a temporary designation table enumerating applied historical information pieces (Step 930). The temporary designation table is for temporarily holding the contents of designated processings of words by the user, and can include the name of a document, the name of a word, the location of the word in the document, the name of a user, and a time stamp, in addition to the designation content itself, as described by referring to FIG. 3. In addition, designation of a processing of the same word is recorded in the temporary designation table by overwriting the old designation. This is because the temporary designation table is used to enable a historical information piece of the historical-information storage unit 215 to be updated according to the content of designation of a confirmed processing.

Then, the masking processor 405 hands over the document subjected to the masking to the score calculator 415, and the score calculator 415 calculates scores representing the safety for words in the unmasked state in the document based on the historical information pieces stored in the historical-information storage unit 215 (Step 935). As described above, the scores representing the safety can be calculated for all the words in the document. Alternatively, the rank of safety can be determined for each word by comparing the calculated score with a score threshold set in advance for each safety rank. Note that when the configuration is employed in which the user is allowed to select a historical information piece to be applied to the word, a series of processing steps denoted by a dotted line with reference numeral 950 in FIG. 9 can be omitted. In addition, the score calculation processing in Step 935 can be omitted as an option.

Thereafter, the reference-information generator 245 hands over the document subjected to the masking which is the processing result in Step 925 (the processing result in Step 915, if the series of steps denoted by 950 is omitted) and score information pieces or rank information pieces to the presentation unit 250. The presentation unit 250 presents the processing result and the information pieces as reference information together with the designation reception screen (Step 940). Then, the processing is terminated. Note that, as described by referring to FIG. 5, the presentation unit 250 can allow the user to determine the contents of processings of words in consideration of the context, by presenting an original target document changed into an image format, together with the designation reception screen. In addition, as described above by referring to FIG. 5, the presentation unit 250 can present a document subjected to a masking in such a mode that the document subjected to a masking allows the user to designate the content of a processing of the document by directly selecting a word.

Figure 10:
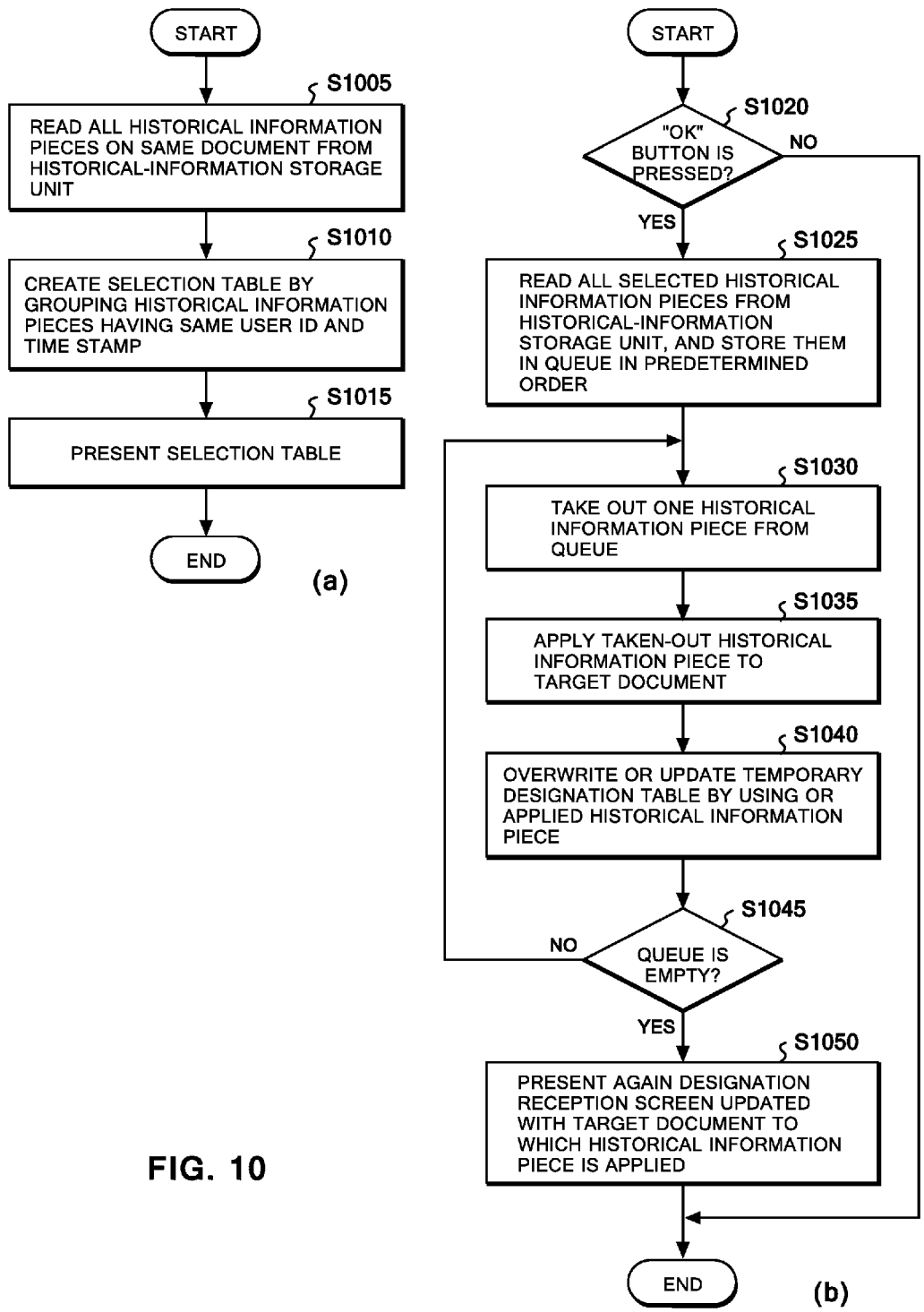
FIG. 10A is a flowchart showing an example flow of a processing of creating a selection table according to an embodiment of the present invention.
FIG. 10B is a flowchart showing an example flow of a masking based on selected historical information pieces according to an embodiment of the present invention.
Figure 11:
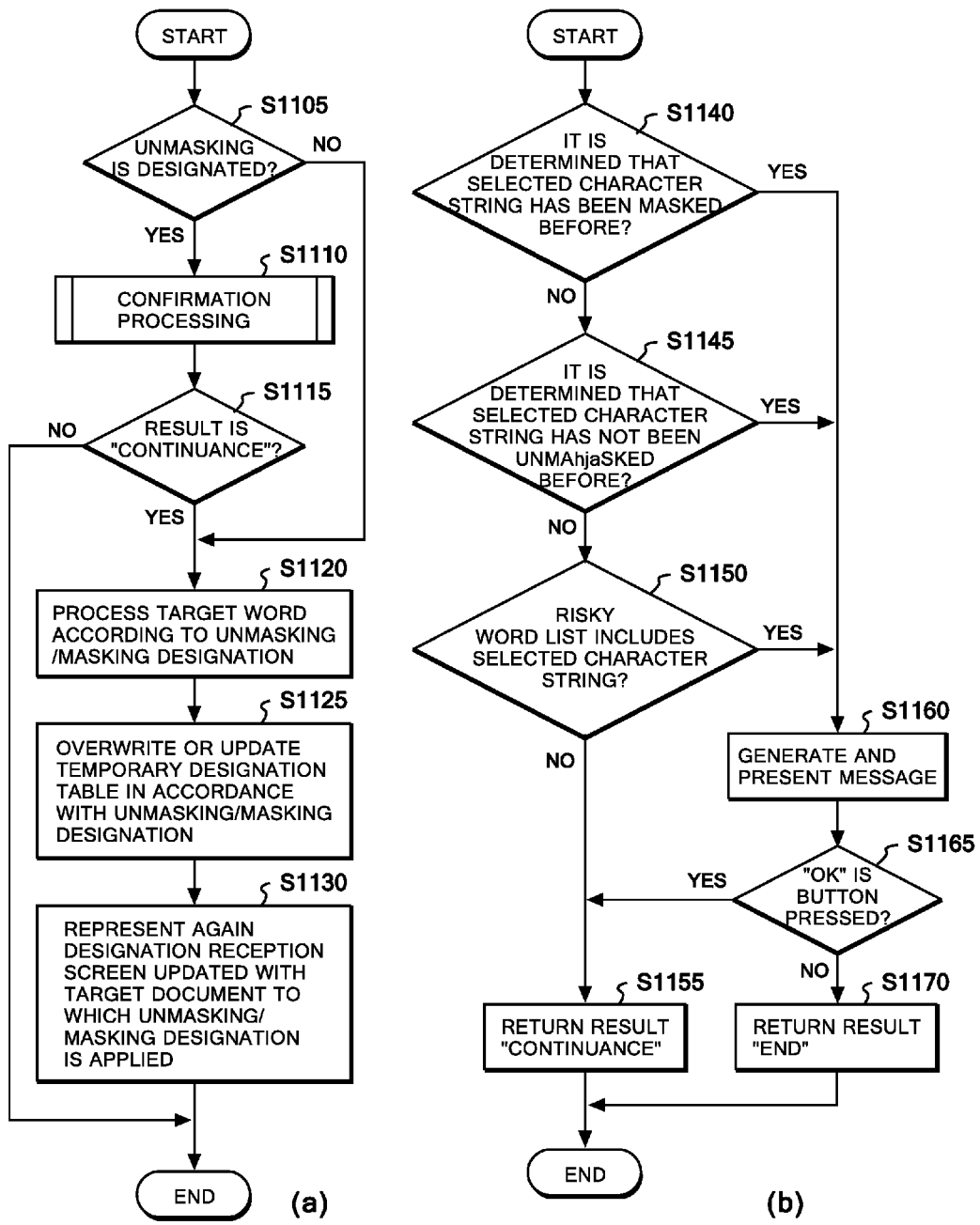
FIG. 11A is a flowchart showing an example flow of a processing of designating an unmasking or a masking of a word according to an embodiment of the present invention.
FIG. 11B is a flowchart showing an example flow of a confirmation processing in Step 1110 in FIG. 11A according to an embodiment of the present invention.

Herein below, on the assumption that the presentation unit 250 presents the designation reception screen 500 shown in FIG. 5 in Step 940 in FIG. 9, processings to be made when the buttons 511 to 519 are pressed, respectively, on the designation reception screen 500 will be described by referring to the drawings FIGS. 10 to 13. FIG. 10A illustrates a flowchart showing an example flow of a processing of creating a selection table. In FIG. 10A, when the user presses the button 517 for history selection shown in FIG. 5 and then the designation reception unit 235 receives the designation of history selection, the processing is started in response to the reception. In Step 1005, the selection table creator 410 having received the designation of the historical information piece selection from the designation reception unit 235 reads, from the historical-information storage unit 215, pieces of historical information related to a document having the same name as the target document currently shown on the designation reception screen.

Then, the selection table creator 410 creates a selection table of historical information pieces associated with the same document name as the target document name in such a manner that the historical information pieces are grouped based on the user name or user ID and time stamp and then arranged in the chronologically ascending order (Step 1010). The reference-information generator 245 hands over the created selection table to the presentation unit 250, and the presentation unit 250 presents the selection table to the user as the new window 600 different from the window of the designation reception screen as shown in FIG. 6, or as a part of the window of the designation reception screen (Step 1015). Then, the processing is terminated.

FIG. 10B illustrates a flowchart showing an example flow of a masking based on selected historical information pieces. In FIG. 10B, when the user presses an OK button 604 or a Cancel button 606 shown in FIG. 6 and the designation reception unit 235 receives designation of history selection completion, the processing is started in response to the reception. In Step 1020, when the masking processor 405 having received the designation of the history selection completion from the designation reception unit 235 determines whether or not the designation of the history selection completion results from the pressing of the OK button 604.

If the designation of the history selection completion results from the pressing of the OK button 604 (Step 1020: YES), the masking processor 405 reads selected historical information pieces from the historical-information storage unit 215 by using the time stamp or user ID of the selected historical information pieces as a key, and then stores in a queue the selected historical information pieces in a predetermined order such as in the chronologically ascending order (Step 1025). On the other hand, if the designation of the history selection completion results from the pressing of the Cancel button 606 (Step 1020: NO), the processing is terminated.

Subsequently, the masking processor 405 takes out one historical information piece from the queue (Step 1030), and applies the taken historical information piece to the target document (Step 1035). To put it differently, when the content of the processing in the historical information piece is an unmasking, the masking processor 405 changes the corresponding word in the target document to be in an unmasked state. Likewise, when the content of the processing in the historical information piece is a masking, the masking processor 405 changes the corresponding word in the target document to be in a masked state. Then, the masking processor 405 updates the temporary designation table by using the applied historical information piece (Step 1040). If the temporary designation table does not exist in Step 1040, the masking processor 405 creates a new temporary designation table. On the other hand, if the temporary designation table exists in Step 1040, the masking processor 405 updates the temporary designation table: by adding the word thereto when a historical information piece on the same word does not exist therein; or by overwriting the historical information piece when a historical information piece on the same word exists therein.

Thereafter, the masking processor 405 determines whether or not the queue is empty (Step 1045). If the queue is not empty (Step 1045: NO), the masking processor 405 returns to Step 1030 to repeat the series of processings. On the other hand, if the queue is empty (Step 1045: YES), the masking processor 405 proceeds to Step 1050, and then hands over the target document to which the selected historical information pieces have been applied, to the presentation unit 250. The presentation unit 250 again presents the designation reception screen updated by using the target document to which the selected historical information pieces have been applied (Step 1050). Then, the processing is terminated.

In addition, although the flowchart in FIG. 10B does not show, after Step 1045, the score calculator 415 can calculate a score of every word or any word in an unmasked state in the target document to which the selected historical information pieces have been applied. Then, in Step 1050, the presentation unit 250 can present the calculated score information pieces together with the designation reception screen.

Next, FIG. 11A illustrates a flowchart showing an example processing flow of designation of an unmasking or a masking of a word. In FIG. 11A, when the user presses any of the Unmask button 511 and the Mask button 513 which are shown in FIG. 5 with a word in a target document being selected by the mouse or the like, and then the designation reception unit 235 receives the unmasking or masking designation, the processing is started in response to the reception. In Step 1105, the masking processor 405 having received designation of a processing of the word from the designation reception unit 235 determines whether or not the designation of the processing of the word results from the pressing of the Unmask button 511.

If the designation of the processing of the word results from the pressing of the Unmask button 511 (Step 1105: YES), the masking processor 405 hands over information on the processing designated by the user including the selected word, to the message generator 420. The message generator 420 performs a confirmation processing for determining whether or not to generate a message (Step 1110). The detail of the confirmation processing will be described later by referring to FIG. 11B. The result of the confirmation processing by the message generator 420 is returned to the masking processor 405, and the masking processor 405 determines whether or not the result of the confirmation processing shows continuance of the processing (Step 1115). If the result of the confirmation processing does not show continuance of the processing (Step 1115: NO), the processing is terminated.

On the other hand, if the result of the confirmation processing shows continuance of the processing (Step 1115: YES), or if the designation of the processing of the word results from the pressing of the Mask button 513 in Step 1105, the masking processor 405 proceeds to Step 1120, and processes the word selected by the user in accordance with the unmasking or masking designation.

Subsequently, the masking processor 405 updates the temporary designation table by using the executed unmasking designation or masking designation (Step 1125). Note that if the temporary designation table does not exist in Step 1125, the masking processor 405 creates a new temporary designation table. On the other hand, if the temporary designation table exists in Step 1125, the masking processor 405 updates the temporary designation table: by adding the word thereto when a piece of historical information on the same word does not exist therein; or by overwriting the historical information piece when a piece of historical information on the same word exists therein.

Then, the masking processor 405 hands over the target document to which the unmasking or masking designation has been applied, to the presentation unit 250, and the presentation unit 250 again presents the designation reception screen updated by using the target document to which the unmasking or masking designation has been applied (Step 1130). Then, the processing is terminated.

In addition, although the flowchart in FIG. 11A does not show, after Step 1120, the score calculator 415 can calculate a score of every word or any word in an unmasked state in the target document to which the unmasking or masking designation has been applied. Then, in Step 1130, the presentation unit 250 can present the calculated score information pieces together with the designation reception screen.

FIG. 11B illustrates a flowchart showing an example flow of confirmation processing by the message generator 420. In FIG. 11B, the processing is started from Step 1140 where the message generator 420 determines, based on the historical information pieces stored in the historical-information storage unit 215, whether or not the same word as the word selected by the user has experienced a masking in the past. If the same word as the selected word has not experienced a masking in the past (Step 1140: NO), the message generator 420 subsequently determines whether or not the same word has not experienced an unmasking (Step 1145).

If the same word has experienced an unmasking in the past (Step 1145: NO), the message generator 420 subsequently determines whether or not the same word is included in the risky word list (Step 1150). If the same word is not included in the risky word list (Step 1150: NO), the message generator 420 returns "continuance" as the result of the confirmation processing (Step 1155), and the processing is terminated.

On the other hand, if YES in any of Steps 1140, 1145, and 1150, the message generator 420 generates a message for confirming unmasking designation in accordance with the corresponding determination result, and the presentation unit 250 presents the message to the user (Step 1160). For example, the message generator 420 can generate a confirmation message 700, as shown in FIG. 7, including: a selected word ("ABC bank" in the example in FIG. 7); a fact ("This word exists in the risky word list." in the example in FIG. 7) turned out by the determination in any of Steps 1140, 1145 and 1150; and a message for reconfirming the unmasking ("Should this word be unmasked?" in the example in FIG. 7). In addition, the confirmation message 700 can include an OK button 702 for designating continuance of the processing and a Cancel button 704 for designating termination of the processing.

Thereafter, when the user designates continuance of the processing through the window 700 for the confirmation message, the designation is handed over from the designation reception unit 235 to the message generator 420. Then the message generator 420 determines whether or not the designation results from the pressing of the OK button 702 (Step 1165). If the designation results from the pressing of the OK button 702 (Step 1165: YES), the message generator 420 returns "continuance" as the result of confirmation processing (Step 1155), and the processing is terminated. On the other hand, if the designation results from the pressing of the Cancel button 704 (Step 1165: YES), the message generator 420 returns "end" (Step 1155) as the result of confirmation processing, and the processing is terminated.

Figure 12:
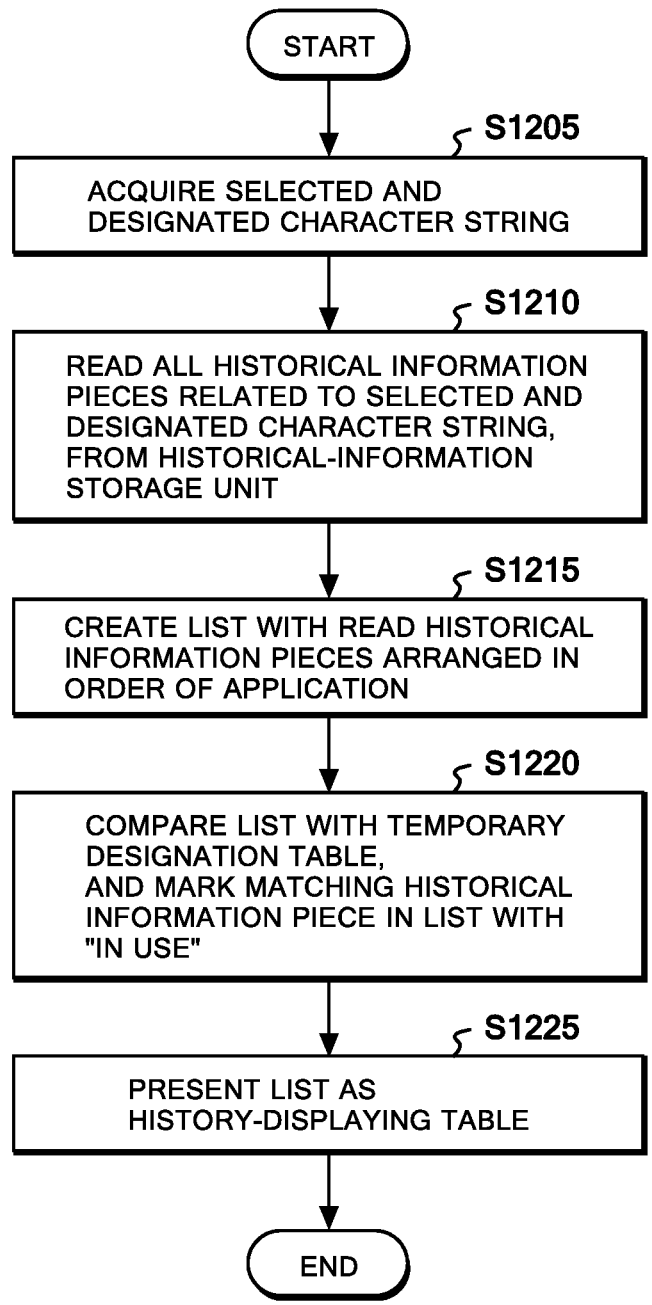
FIG. 12 is a flowchart showing an example flow of a processing of displaying a use history of a selected word according to an embodiment of the present invention.

Next, FIG. 12 illustrates a flowchart showing an example flow of a processing of displaying a use history of a selected word. In FIG. 12, when the button 515 for history confirmation shown in FIG. 5 is pressed with a word in a target document being selected by the user by using the mouse or the like and then the designation reception unit 235 receives the designation of history confirmation, the processing is started in response to the reception. In Step 1205, the history-displaying table creator 425 acquires information on the word selected by the user, from the designation reception unit 235.

Thereafter, the history-displaying table creator 425 reads historical information pieces of past processings of the selected word, from the historical-information storage unit 215 (Step 1210), and then creates a list by arranging the historical information pieces in the chronologically ascending order (Step 1215). Then, the history-displaying table creator 425 compares the created list with the temporary designation table. If there is a match, the matching historical information piece in the created list is given a mark indicating that the information piece is in use (Step 1220). The history-displaying table creator 425 hands over the created list to the presentation unit 250, and lastly the presentation unit 250 presents the list to the user as the window 800 of the history-displaying table as shown in FIG. 8 (Step 1225). Then, the processing is terminated.

Figure 13:
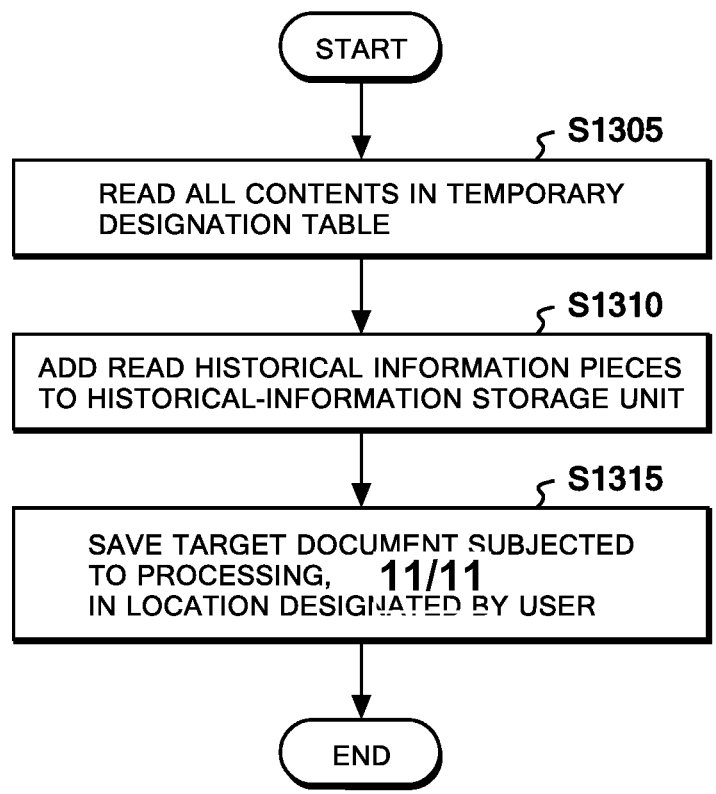
FIG. 13 is a flowchart showing an example flow of a processing of saving a target document according to an embodiment of the present invention.

Next, FIG. 13 illustrates a flowchart showing an example flow of a processing of saving a target document. In FIG. 13, when the Save button 519 shown in FIG. 5 is pressed and then the designation reception unit 235 receives the designation of saving the target document, the processing is started in response to the reception. In Step 1305, the reference-information generator 245 having received the designation of saving the target document from the designation reception unit 235 reads all the contents of the temporary designation table, and adds the read contents of the designation to the historical-information storage unit 215 (Step 1310).

Likewise, the presentation unit 250 having received a designation of saving the target document from the designation reception unit 235 further acquires from the designation reception unit 235 information on the saving location of the target document designated by the user, and then saves the target document subjected to the current processing in the designated location (Step 1315). Then, the processing is terminated.

Although the present invention has been described by use of the embodiments hereinabove, the technical scope of the present invention is not limited to the above descriptions of the embodiments. It will be apparent to those skilled in the art that modifications and improvements can be made to the above embodiments. Accordingly, such modified or improved embodiments are also included in the technical scope of the present invention, as a matter of course.

What is claimed is:

1. A support apparatus for supporting a processing of a character string in a document, said support apparatus comprising:
   a document storage device which stores a plurality of shared documents;
   a designation reception unit which receives a designation from a user;
   a document acquisition unit which acquires one of said documents from said document storage device based on said designation of said user;
   a historical-information storage device which stores pieces of historical information on past processings of character strings in said documents in said document storage device;
   a risky-word list, stored in said document storage device, listing a plurality of risky words common to said documents;
   a reference-information generator which reads said historical information pieces related to said acquired document from said historical-information storage device, and thereby generates reference information for helping said user to select a processing of a character string in said acquired document, said processing of said character string including: a masking or unmasking of said character, said masking including: identifying, in said acquired document, at least one risky word in said risky word list, and upon identifying, automatically referring to an electronic dictionary, and replacing said identified at least one risky word with another term found in said referred electronic dictionary;
   a presentation unit which presents, to said user, a designation reception screen for receiving a designation of said replacing of said character string with said another term, together with said reference information;
   a score calculator, included in the reference-information generator, which obtains a frequency of how often each of said character strings in said documents has been used in an unmasked or masked state before by using said read historical information pieces, and then calculates a score representing a risky word measurement of each character string; and
   wherein said score is calculated based on: a number of times that said character string is unmasked or masked at a same position in said acquired document; a number of times that said character string is unmasked or masked in a different document; and a number of times that represents how many times said character string is unmasked or masked at a different position in said acquired document.

2. The support apparatus according to claim 1, wherein said reference-information generator comprises a masking processor which performs a masking on said acquired document in such a way that said read historical information pieces are reflected on said acquired document, and said presentation unit receives as said reference information said acquired document subjected to said masking from said reference-information generator.

3. The support apparatus according to claim 2, further comprising:
   a selection table creator which reads pieces of historical information applicable to said acquired document from said historical-information storage device and creates a selection table that includes said historical information pieces in such a mode that any of said historical-information pieces is selectable by said user, wherein said masking processor performs a masking on said acquired document in such a way that said historical information piece selected by said user through said selection table is reflected on said acquired document.

4. The support apparatus according to claim 3, wherein each of said pieces of historical information on said past processings of said character strings in said documents, stored in said historical-information storage device is selected from the group consisting of: user identification information for identifying a user who designates a processing, group identification information for identifying a group to which said user belongs, and time stamp information.

5. The support apparatus according to claim 2, wherein each of said pieces of historical information on said past processings of said character strings in said documents, stored in said historical-information storage device includes time stamp information, and said masking processor performs a masking on said acquired document in such a way that said read historical information pieces are reflected on said acquired document in a chronologically ascending order.

6. The support apparatus according to claim 2, wherein each of said pieces of historical information on said past processings of said character strings in said documents, stored in said historical-information storage device is a historical information piece on a past unmasking and/or a past masking, and said masking processor performs a masking on said acquired document in such a way that said historical information piece on said masking is reflected on said acquired document after said historical information piece on said unmasking is reflected.

7. The support apparatus according to claim 2, further comprising:

a safe-word list storage device which stores a safe word list common to all documents, wherein said masking processor performs a masking on said acquired document in such a way that said safe word list is reflected on said document before said historical information pieces are reflected.

8. The support apparatus according to claim 7, further comprising:
a safe-word list editing unit which obtains a character string that is highly frequently unmasked on the basis of said historical information pieces stored in said historical-information storage device, and then additionally stores said obtained character string in said safe-word list storage device.

9. The support apparatus according to claim 1, wherein said presentation unit receives said score for each character string as said reference information from said reference information generator.

10. The support apparatus according to claim 2, wherein: said designation reception unit receives said designation made by said user through said designation reception screen presented by said presentation unit, said reference information generator includes a message generator which generates a message for confirming said designation if said designation is a designation of an unmasking of a character string in said document and if said historical information pieces stored in said historical-information storage device do not include a historical information piece indicating an unmasking of said same character string, and said presentation unit presents said message to said user.

11. The support apparatus according to claim 2, wherein: said designation reception unit receives said designation made by said user through said designation reception screen presented by said presentation unit, said reference information generator includes a message generator which generates a message for confirming said designation if said designation is a designation of an unmasking of a character string in said document and if said historical information pieces stored in said historical-information storage device include a historical information piece indicating a masking of said same character string, and said presentation unit presents said message to said user.

12. The support apparatus according to claim 2, wherein said designation reception unit receives said designation made by said user through said designation reception screen presented by said presentation unit, said reference information generator comprises a message generator which generates a message for confirming said designation if said designation is a designation of an unmasking of a character string in said document and if said risky word list stored in said risky-word list storage device includes said character string, and said presentation unit presents said message to said user.

13. The support apparatus according to claim 1, wherein: said designation reception unit receives a designation of a processing of a character string in said document from said user through said designation reception screen, and said reference information generator processes said document in such a way that said designation of said processing is reflected on said document, and stores the content of said designation as a new historical information piece in said historical-information storage device on the condition that said designation of said processing is confirmed.

14. The support apparatus according to claim 1, wherein said presentation unit further presents an original of said document in an uncopiable state, said original being a document before a masking.

15. The support apparatus according to claim 1, wherein said designation reception unit receives a selection designation, of a character string in said document, made by said user through said designation reception screen presented by said presentation unit, and said support apparatus further comprises a history-displaying table creator which (i) reads pieces of historical information on said selected and designated character string from said historical-information storage device, and (ii) creates a table enumerating the contents of said past processings of said selected and designated character string so as to present said read historical information pieces to said user.

16. The support apparatus according to claim 1, wherein said score is calculated by computing $S=aA+bB+cC-dD-eE-fF$, where a, b, c, d, e, and f are coefficients, a is larger than b, b is larger than c, and d is larger than e, e is larger than f, A represents how many times said character string is unmasked at a same position in said acquired document, B represents how many times said character string is unmasked at the different position in said acquired document, C represents how many times said character string is unmasked in the different document, D represents how many times said character string is masked at said same position in said acquired document, E represents how many times said character string is masked at the different position in said acquired document, and F represents how many times said character string is masked in the different document.

17. A computer-implemented method for supporting a processing of a character string in a document executed by a computer having a processor device, wherein said processor device is capable of accessing a document storage device which stores a plurality of shared documents and accessing a history storage device which stores pieces of historical information on past processings of character strings in said documents in said document storage device, said method comprising the steps executed by said processor device of:
receiving designation from a user;
storing, in a risky word list, a plurality of risky words common to said documents;
acquiring a document from said document storage device based on said designation by said user;
reading pieces of historical information related to said acquired document from said historical-information storage device, and thereby generating reference information for helping said user to select a processing of said character string in said document, said processing of said character string including: a masking or unmasking of said character, said masking including: identifying, in said acquired document, at least one risky word in said risky word list, and upon identifying, automatically referring to an electronic dictionary, and replacing said identified at least one risky word with another term found in said referred electronic dictionary;
presenting, to said user, a screen for receiving said designation of said replacing of said character string with said another term, together with said reference information;
obtaining a frequency of how often each of said character strings in said documents has been used in an unmasked or masked state before by using said read historical information pieces and then calculating a score representing a risky word measurement of each character string, said score being calculated based on: a number of times that said character string is unmasked or masked at a same position in said acquired document; a number of times that said character string is unmasked or masked in a different document; and a number of times that represents how many times said character string is unmasked or masked at a different position in said acquired document.

18. The computer-implemented method according to claim 17, wherein said score is calculated by computing S=aA+bB+cC−dD−eE−fF, where a, b, c, d, e, and f are coefficients, a is larger than b, b is larger than c, and d is larger than e, e is larger than f, A represents how many times said character string is unmasked at a same position in said acquired document, B represents how many times said character string is unmasked at the different position in said acquired document, C represents how many times said character string is unmasked in the different document, D represents how many times said character string is masked at said same position in said acquired document, E represents how many times said character string is masked at the different position in said acquired document, and F represents how many times said character string is masked in the different document.

19. An article of manufacture comprising a non-transitory computer readable data storage device tangibly embodying computer readable instructions which when implemented, cause a computer device to perform steps of a computer-implemented method for supporting a processing of a character string in a document, the computer device for accessing a document storage device which stores a plurality of shared documents and accessing a history storage device which stores pieces of historical information on past processings of character strings in said documents in said document storage device, the steps of:

receiving designation from a user;

storing, in a risky word list, a plurality of risky words common to said documents;

acquiring a document from said document storage device based on said designation by said user;

reading historical information pieces related to said acquired document from said historical-information storage device, and thereby generating reference information for helping said user to select a processing of said character string in said document, said processing of said character string including: a masking or unmasking of said character, said masking including: identifying, in said acquired document, at least one risky word in said risky word list, and upon identifying, automatically referring to an electronic dictionary, and replacing said identified at least one risky word with another term found in said referred electronic dictionary;

presenting, to said user, a screen for receiving said designation of said replacing of said character string with said another term, together with said reference information;

obtaining a frequency of how often each of said character strings in said documents has been used in an unmasked or masked state before by using said read historical information pieces, and then calculating a score representing a risky word measurement of each character string, said score being calculated based on: a number of times that said character string is unmasked or masked at a same position in said acquired document; a number of times that said character string is unmasked or masked in a different document; and a number of times that represents how many times said character string is unmasked or masked at a different position in said acquired document.

20. The article of manufacture according to claim 19, wherein said score is calculated by computing S=aA+bB+cC−dD−eE−fF, where a, b, c, d, e, and f are coefficients, a is larger than b, b is larger than c, and d is larger than e, e is larger than f, A represents how many times said character string is unmasked at a same position in said acquired document, B represents how many times said character string is unmasked at the different position in said acquired document, C represents how many times said character string is unmasked in the different document, D represents how many times said character string is masked at said same position in said acquired document, E represents how many times said character string is masked at the different position in said acquired document, and F represents how many times said character string is masked in the different document.

* * * * *